Jan. 7, 1930.  T. A. BOOR  1,743,013
HARVESTING MACHINE
Filed Dec. 10, 1927  3 Sheets-Sheet 2
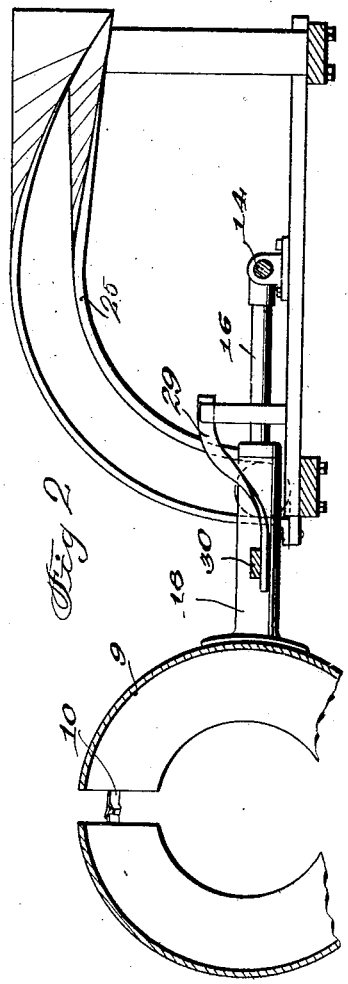
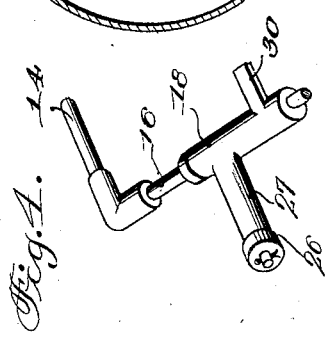
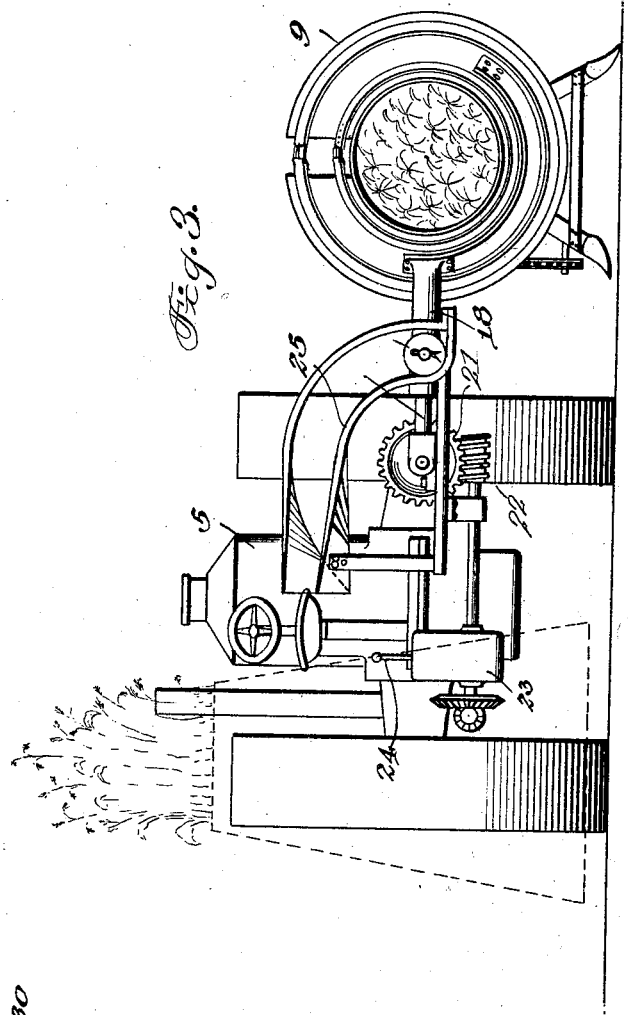
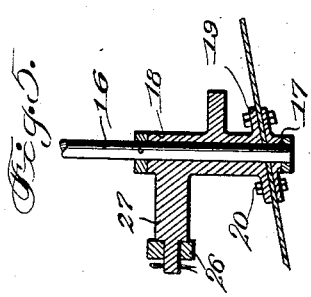
INVENTOR
T. A. BOOR
BY
ATTORNEY

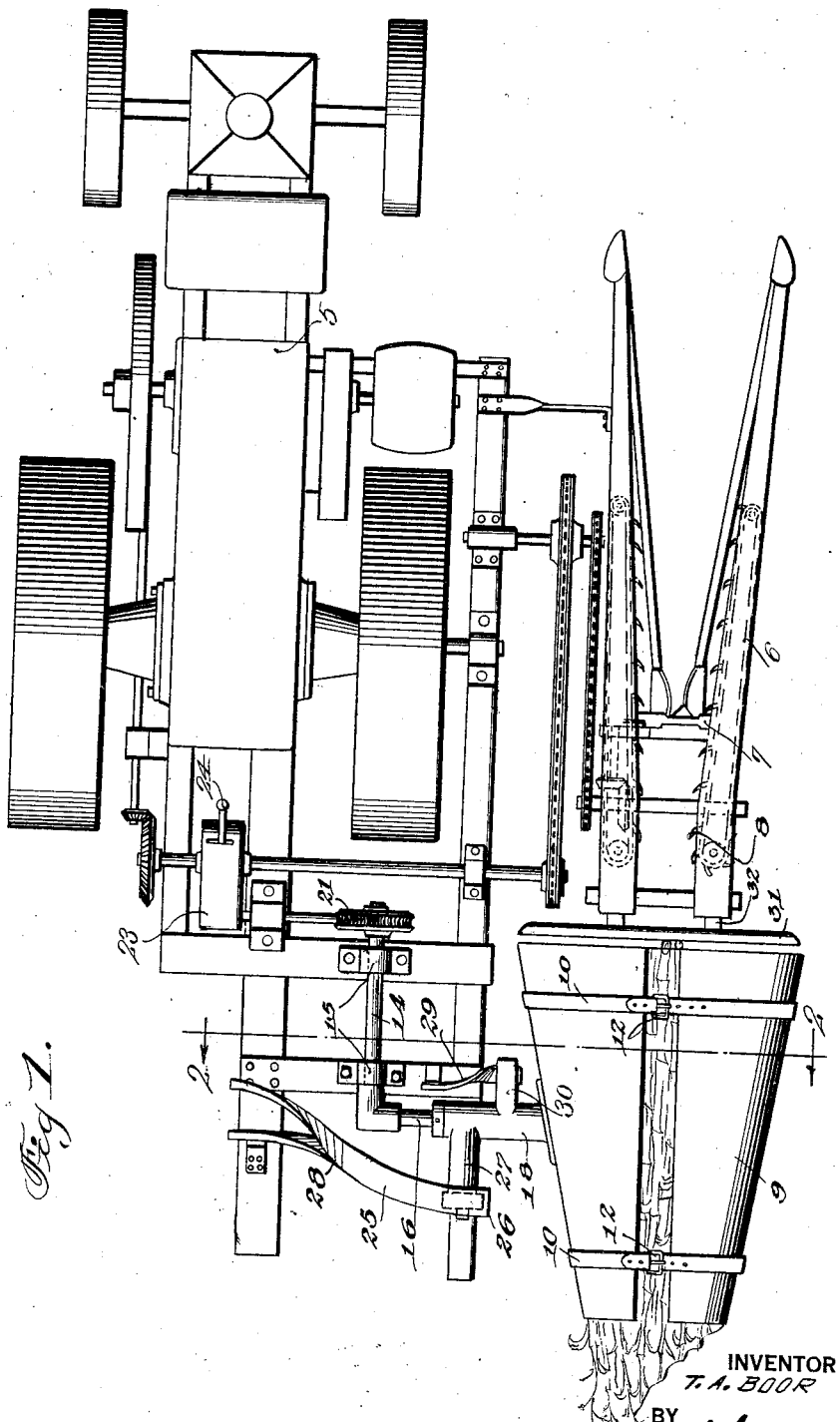

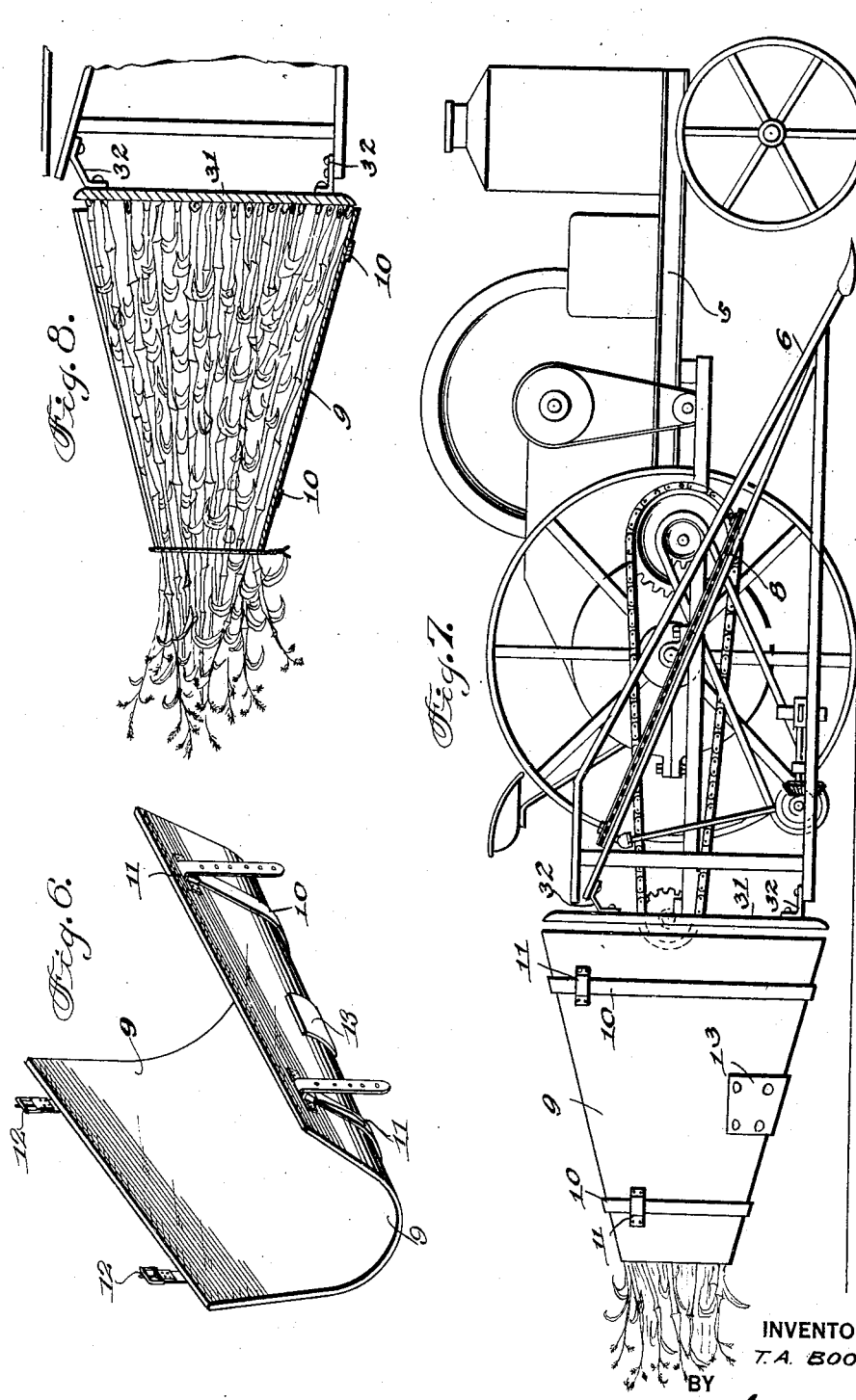

Patented Jan. 7, 1930

1,743,013

UNITED STATES PATENT OFFICE

THEODORE A. BOOR, OF ASHEVILLE, OHIO

HARVESTING MACHINE

Application filed December 10, 1927. Serial No. 239,174.

My invention relates to combined harvesting machines and shockers and an object thereof is to provide a machine of this character wherein the cut stalks are formed into shocks which are deposited on the ground in an-out-of-the-way position to one side of the machine to permit the machine to operate on the next row of stalks without any interference by the formed shocks.

Further the invention contemplates a shock former for harvesting machines whereby the shocks are carried from a horizontal position at one side of the machine to a vertical position at the opposite side of the machine and deposited upon the ground in a standing position.

The invention also provides an improved mechanism for simultaneously swinging the shock transversely of the machine, arranging the shock in a vertical position and then return the shock former to normal horizontal position after each shock is formed and deposited.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a top plan view of the invention;

Figure 2 is a horizontal sectional view taken on line 2—2 of Figure 1;

Figure 3 is a rear end elevation, the broken line showing indicating the shock former in actuated position;

Figure 4 is a perspective of one of the elements embodied in the invention;

Figure 5 is a fragmentary sectional detail view;

Figure 6 is a perspective of the shock former;

Figure 7 is a side elevation of the machine; and

Figure 8 is a vertical sectional view taken on line 8—8 of Figure 1.

Referring to the invention in detail a conventional stalk harvesting machine 5, having the usual stalk guide 6 supported from one side thereof in which a reciprocatory cutter 7 is mounted to sever the stalks, is provided. As the stalks are severed they are carried in a rearward direction by a conveyor or endless apron 8 arranged rearwardly of the cutter in the guide 6.

To receive the severed stalks and form the same into shocks as the former are conveyed rearwardly upon the endless apron, a shock former 9 is arranged to one side of the frame of the harvesting machine in longitudinal alinement with the endless apron, rearwardly of the latter. This shock former is formed from a length of stout semi-flexible material 10 such as heavy canvas or leather, and is cut so that it will take the form of a frusto-cone when completely surrounding the shock. Normally the shock holder assumes a trough-like or semi-circular configuration so as to receive the severed stalks from the endless apron.

Straps 11, extending transversely around the sheet 10 and received in loops 11 adjacent the ends of this sheet, are provided for drawing the latter into frusto-cone shape around the stalks to form the shock, the straps carrying buckles 12 at one end for engagement with the free ends of the former. To aid the sheet 10 in normally retaining the trough-like formation, as disclosed in Figure 6, a longitudinally curved resilient metallic strip or plate 13 is arranged centrally of the under face of the sheet and is riveted or otherwise secured thereto.

The shock former is mounted for swinging movement transversely of the machine and rotation about a horizontal axis, and for this purpose a horizontally disposed rock shaft 14, extending longitudinally of the frame of the machine, is journalled in bearings 15 attached to the upper face thereof. The rock shaft carries a right angularly extending cylindrical arm 16 which projects from one side of the machine frame and has its free end extended through the shock former at one side thereof centrally of its ends. This end of the arm is journalled in a bearing 17 disposed upon the inner face of the shock former. A sleeve 18 is rotatable about the arm 16 and has a base flange 19 which engages the outer face of the shock former. Transverse fastenings 20 pass through the flange 19, shock former, and bearing 17 to fix the sleeve to the shock former. At one end the rock shaft 14 carries a worm gear 21 which is driven from a worm shaft 22 operatively connected with the operating mechanism of the machine, as illustrated in Figure 1.

A gear box 23 is supported on the frame of the harvesting machine and contains forward and reverse gears (not shown) to be selectively brought into engagement with the worm shaft 22 by means of the usual hand lever 24 to rock the rock shaft in a clockwise or counter clockwise direction.

For the purpose of rotating the shock former about the arm 16 as the rock shaft is actuated in a clockwise direction, means is provided comprising a pair of transversely extending arcuate parallel trackways 25 attached to and rising from the machine rearwardly of the rock shaft. A roller 26 carried by a lateral extension 27, projecting from the sleeve 18, traverses the trackways as the rock shaft and shock former are swung transversely. As particularly illustrated in Figure 2, the trackways are arranged with their transverse axes horizontal from their lower ends to a point intermediate their ends, and from such intermediate point the trackways are spirally twisted as at 28 to dispose their upper end portions in a plane where their transverse axes are vertical. It will be observed that as the roller follows the trackways it will move from a horizontal position to a full vertical position as it reaches the upper end of the trackways and thereby rotates the sleeve 18 and shock former to arrange the latter vertically with its base end adjacent the ground.

In order to return the shock former to normal horizontal position as the rock shaft is actuated in a counter clockwise direction, a small trackway 29, identical to the trackway 25, but arranged reversely to the latter, is attached to the machine forwardly of the trackway 25 and in advance of the arm 16. A lateral lug 30 projects from the inner end of the sleeve at a point diametrically opposite the extension 27 and rides along the trackway 29 and is thereby rocked from a vertical position to a horizontal position rotating the sleeve and shock former. As the shock former assumes its normal position rearwardly of the endless apron 8, the roller 26 will have been engaged with the lower end of the trackway 25 ready for the next operation.

To prevent the cut stalks from passing from the base end of the shock former as they are conveyed to the latter, a vertically arranged disk or abutment wall 31 is supported from the rear end of the guide 6 by brackets 32.

Operation

The shock former being in normal horizontal position behind the guide 6, the severed stalks are advanced longitudinally on the apron 9 and fall lengthwise into the shock former. When sufficient stalks have been conveyed to the shock former to produce the shock, the shock former is drawn around the stalks and held in frusto-conical formation by the adjustable straps 11 engaging the buckles 12. The shock is then tied at its upper end by a wire or tying element. The rock shaft 14 is now rocked in a clockwise direction to swing the shock former with the completed shock therein, to the opposite side of the machine and due to the roller. Traversing the trackway 28 the shock former is disposed in a vertical position. While in this position the straps are disengaged from the buckles and the shock removed from the shock former. The rock shaft is then rotated in a counter clockwise direction to swing the shock former to a position rearwardly of the endless apron 9, and due to engagement of the lug 30 with the trackway 29 the shock former is caused to assume a horizontal position where it is ready for the next shock forming operation.

What is claimed is:

1. In combination a stalk harvesting machine, a normally horizontally disposed shock former arranged to receive the severed stalks, means for supporting the shock former to swing transversely from one side of the machine to the other, and means for causing the shock former to assume a vertical position at the last mentioned side of the machine.

2. In combination a stalk harvesting machine, a normally horizontally disposed shock former arranged to receive the severed stalks and, means for supporting the shock former to swing transversely from one side of the machine to the other, means for causing the shock former to assume a vertical position at the last mentioned side of the machine, and means for causing the shock former to assume a horizontal position upon return to normal position.

3. In combination a support, and a shock former pivotally supported therefrom to swing from one side of the support to the other, and coacting means on the support and shock former whereby to cause the shock former to assume a vertical position at one side of the support and a horizontal position at the opposite side thereof.

4. In a shock former, a support, a rock shaft journalled thereon, an arm carried thereby, a shock forming member movable with the arm and capable of rotation thereon, means for rocking the arm in opposite directions to dispose the shock forming member at one side of the support, and means operable to rotate the shock forming member to vertical and horizontal positions incident to the actuation of the rock shaft.

5. In combination a support, an arm pivoted thereto to swing about a horizontal axis, a trough-like shock former to receive stalks therein and capable of completely embracing such stalks to form the shock, a sleeve fixed to the shock former and projecting laterally from one side thereof and revoluble on the arm, and means for rotating the sleeve to dispose the shock former in a vertical position upon movement of the arm in one direction and to dispose the shock former in a horizontal position upon movement of the arm in the opposite direction.

6. In combination a support, an arm pivoted thereto to swing about a horizontal axis, a substantially tubular shock former carried by the arm and capable of rotation thereon, and means for rotating the shock former to dispose the same in a vertical position upon movement of the arm in one direction and to dispose it in a horizontal position upon movement of the arm in the opposite direction.

7. In combination a support, an arm pivoted thereto to swing about a horizontal axis, a substantially tubular shock former carried by the arm and capable of rotation thereon, reversely disposed eccentric members on the support, and laterally projecting elements fixed to the shock former, one of which being engageable with one eccentric member to rotate the shock former to a vertical position upon movement of the arm in one direction, and the other being engageable with the other eccentric member to rotate the shock former to a horizontal position upon movement of the arm in the opposite direction.

8. The combination with a stalk gathering machine, of a tubular shock forming member pivotally supported on the machine to swing from one side to the other and normally disposed in a horizontal position to receive stalks as they are gathered, and means operable to dispose the shock forming member in a vertical position when swung to one of such positions to permit the shock to be removed while in a vertical position and to dispose the shock former in normal position when swung to the opposite side of the machine.

9. The combination with a stalk gathering mechanism having a longitudinally movable conveyor upon which stalks are carried rearwardly in a horizontal position, of a normally horizontally disposed shock former movable transversely of the stalk gathering mechanism to receive the stalks and carry them from one side of the stalk gathering mechanism to the other, and means for causing the shock former to assume a vertical position at such side of the stalk gathering mechanism whereby to arrange the shock in a vertical position.

10. The combination with a stalk harvester having a rearwardly movable conveyor upon which harvested stalks are conveyed in a horizontal position, of a shock former normally disposed in a horizontal position rearwardly of the conveyor to receive the stalks therein and movable transversely of the harvester to a position at its opposite side, and means operable to cause the shock former to assume a vertical position at such side whereby to dispose the shock in a vertical position.

11. The combination with a vehicle, of a shock former supported thereby and normally disposed in a horizontal position to one side thereof, means for supporting the shock for movement transversely of the vehicle to its opposite side, and means for disposing the shock former in a vertical position at such opposite side.

12. The combination with a vehicle of a longitudinally disposed rock shaft journalled thereon, a laterally projecting arm carried thereby and normally disposed in a horizontal position, a normally horizontally disposed shock former carried by the arm and capable of rotation thereon, means for actuating the rock shaft to swing the shock former to one side of the vehicle or the other, and means for causing the shock former to assume a vertical position incident to the movement of the rock shaft in one direction.

13. A shock former comprising a sheet of semi-flexible material, a longitudinally curved resilient plate secured to the outer face thereof for normally holding the sheet in channel-shaped formation, and fastenings associated with the opposite longitudinal edges of the sheet for securing the latter in tubular formation about the shock.

Signed at Asheville, in the county of Pickaway and State of Ohio, this 29 day of November, A. D. 1927.

THEODORE A. BOOR.